(No Model.) 12 Sheets—Sheet 1.
C. M. LAMB.
WIRE FENCE MACHINE.
No. 534,893. Patented Feb. 26, 1895.
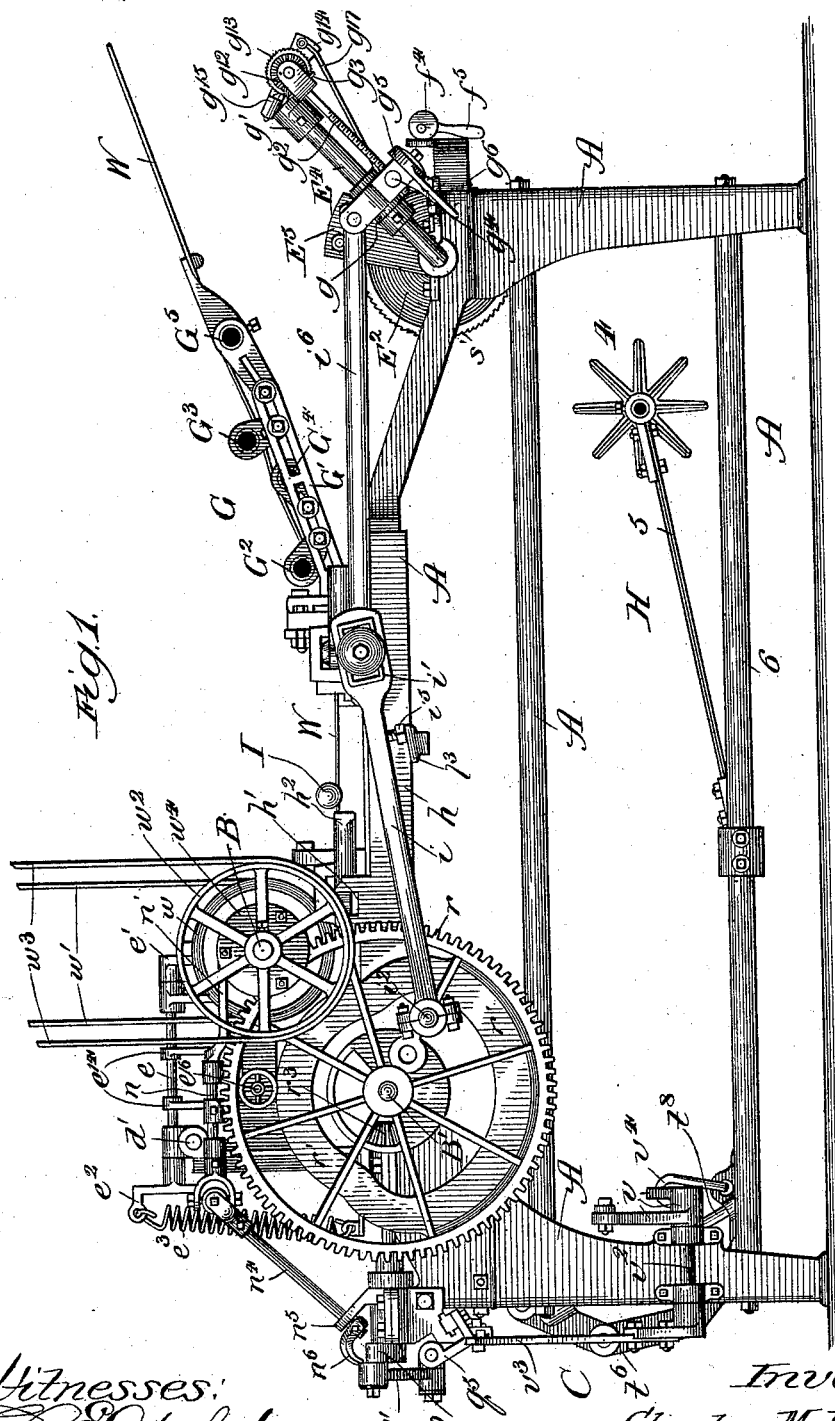
Witnesses:
Chas. E. Gaylord
Luth J. Alter
Inventor:
Charles M. Lamb,
By Dyrenforth & Dyrenforth,
Attys.
THE NORRIS PETERS CO., PHOTO-LITHO., WASHINGTON, D. C.

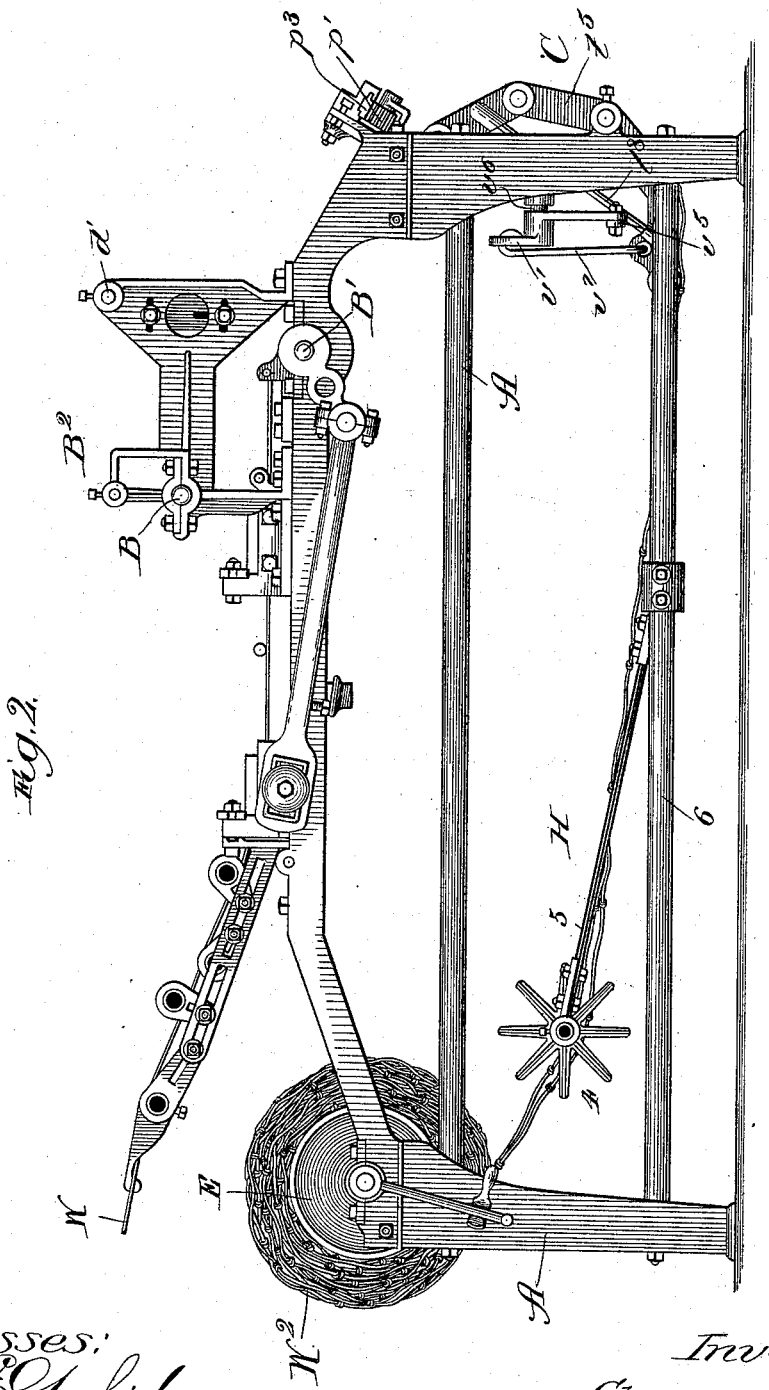

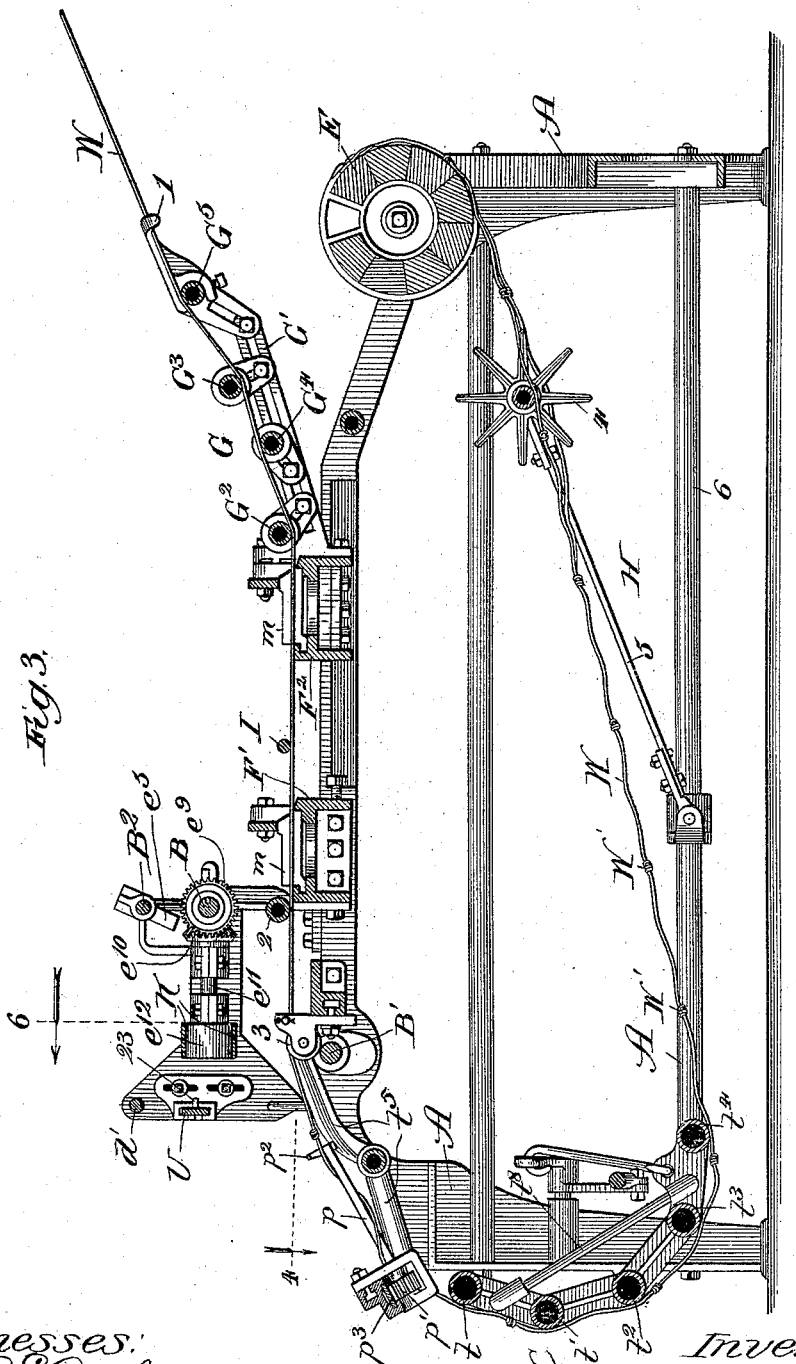

(No Model.) 12 Sheets—Sheet 4.
C. M. LAMB.
WIRE FENCE MACHINE.
No. 534,893. Patented Feb. 26, 1895.
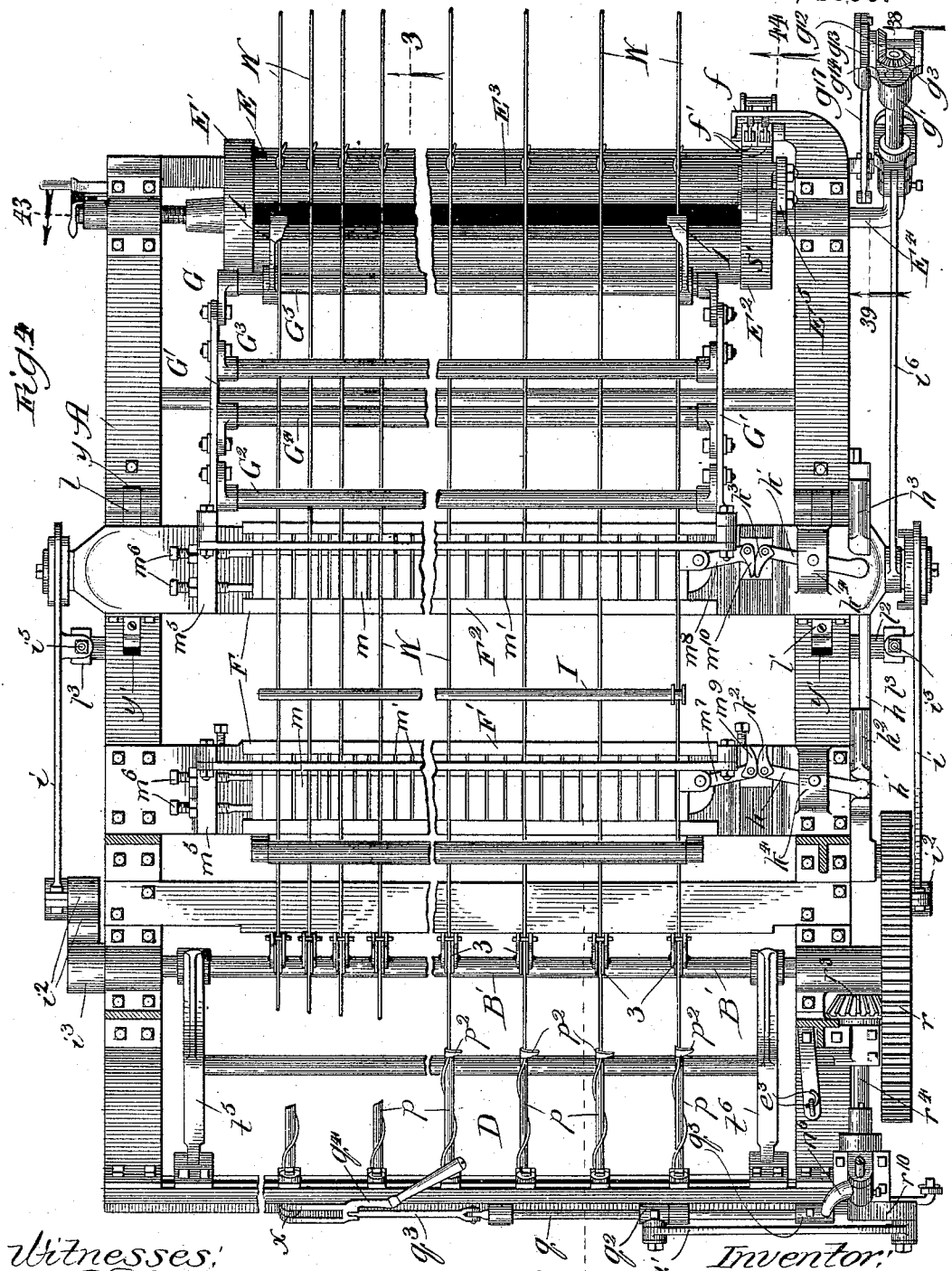
Witnesses:
Inventor:
Charles M. Lamb
By Dyrenforth & Dyrenforth,
Att'ys.

(No Model.) 12 Sheets—Sheet 5.
C. M. LAMB.
WIRE FENCE MACHINE.
No. 534,893. Patented Feb. 26, 1895.
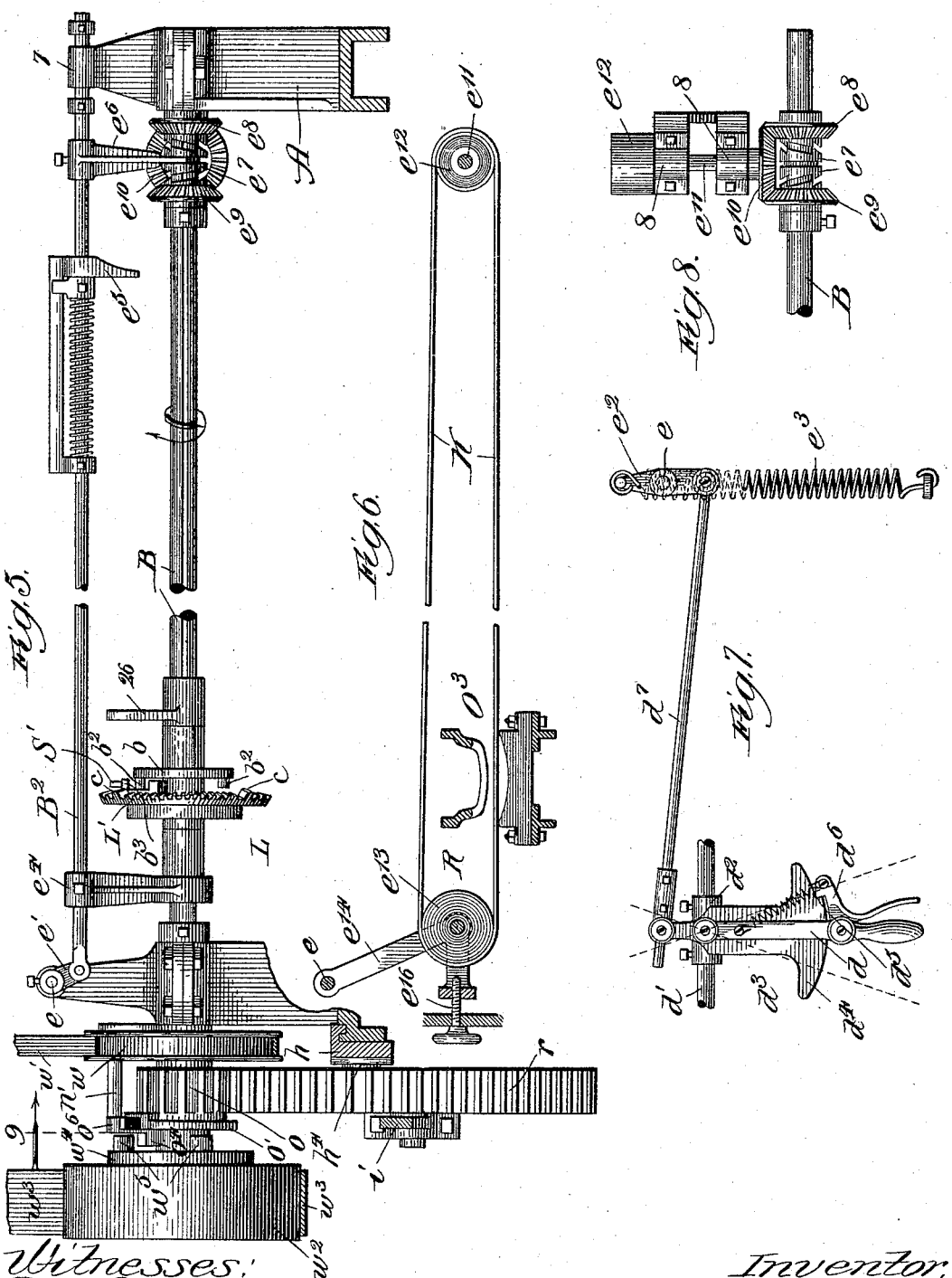

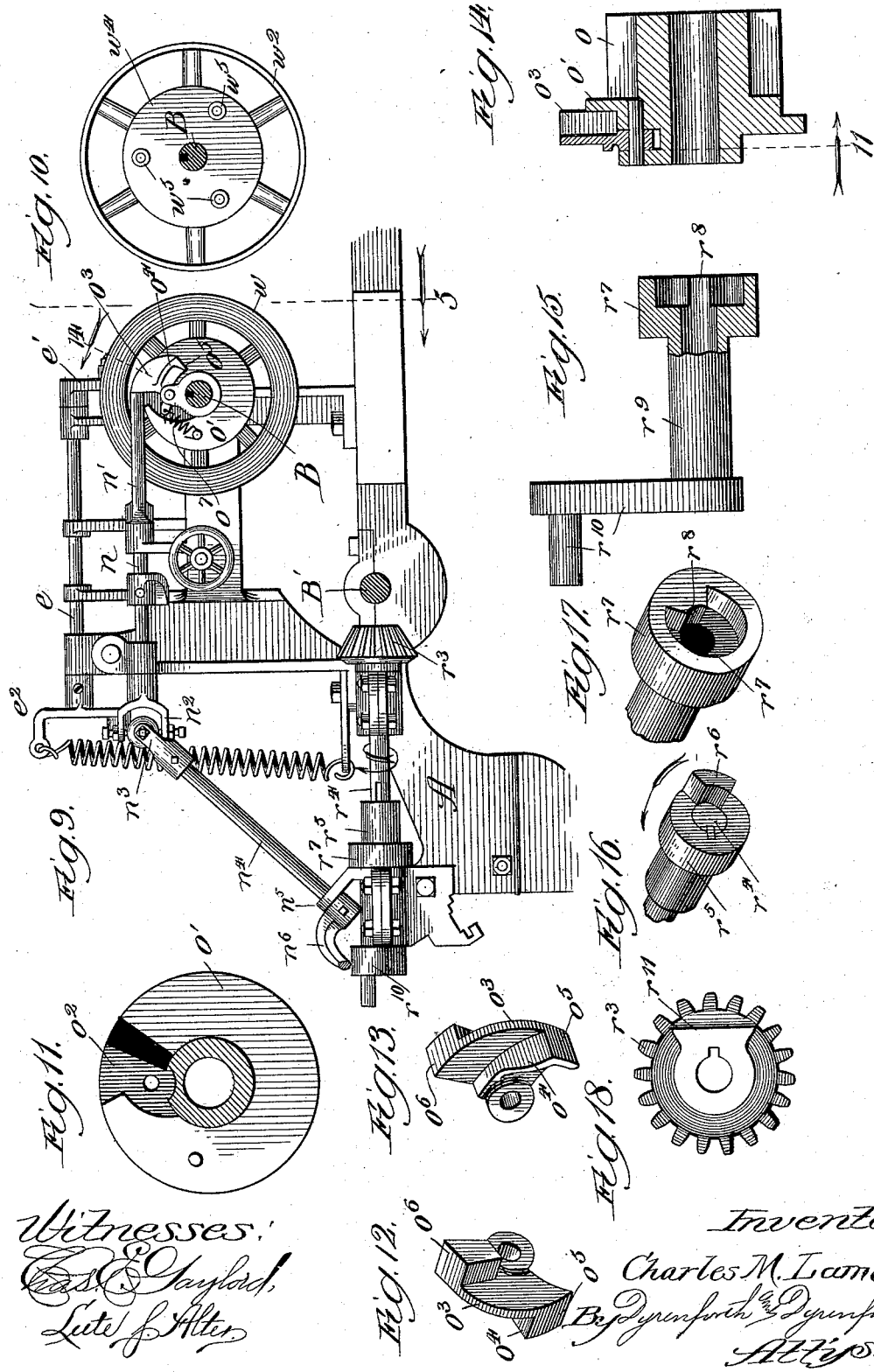

(No Model.) 12 Sheets—Sheet 7.
C. M. LAMB.
WIRE FENCE MACHINE.
No. 534,893. Patented Feb. 26, 1895.
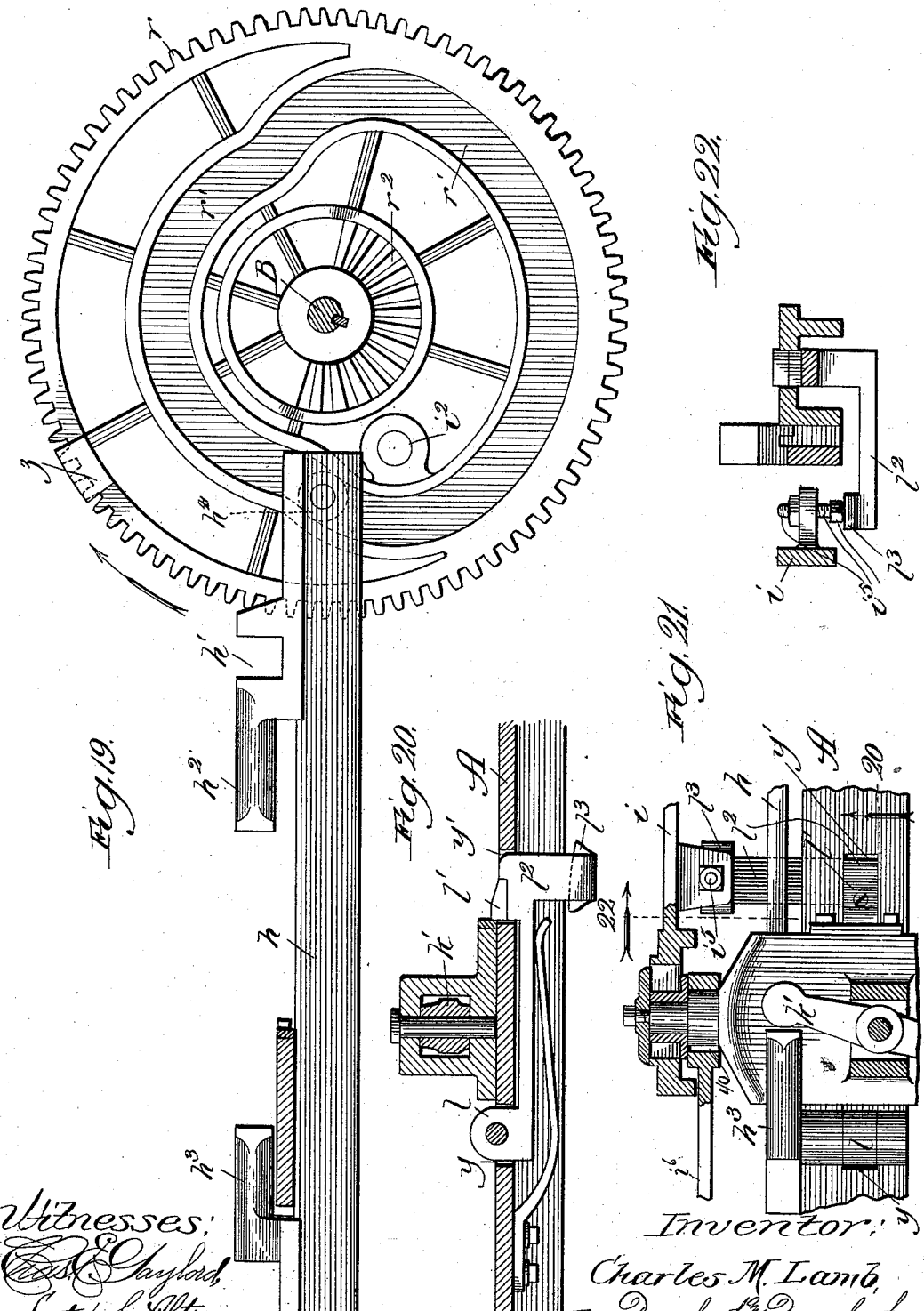

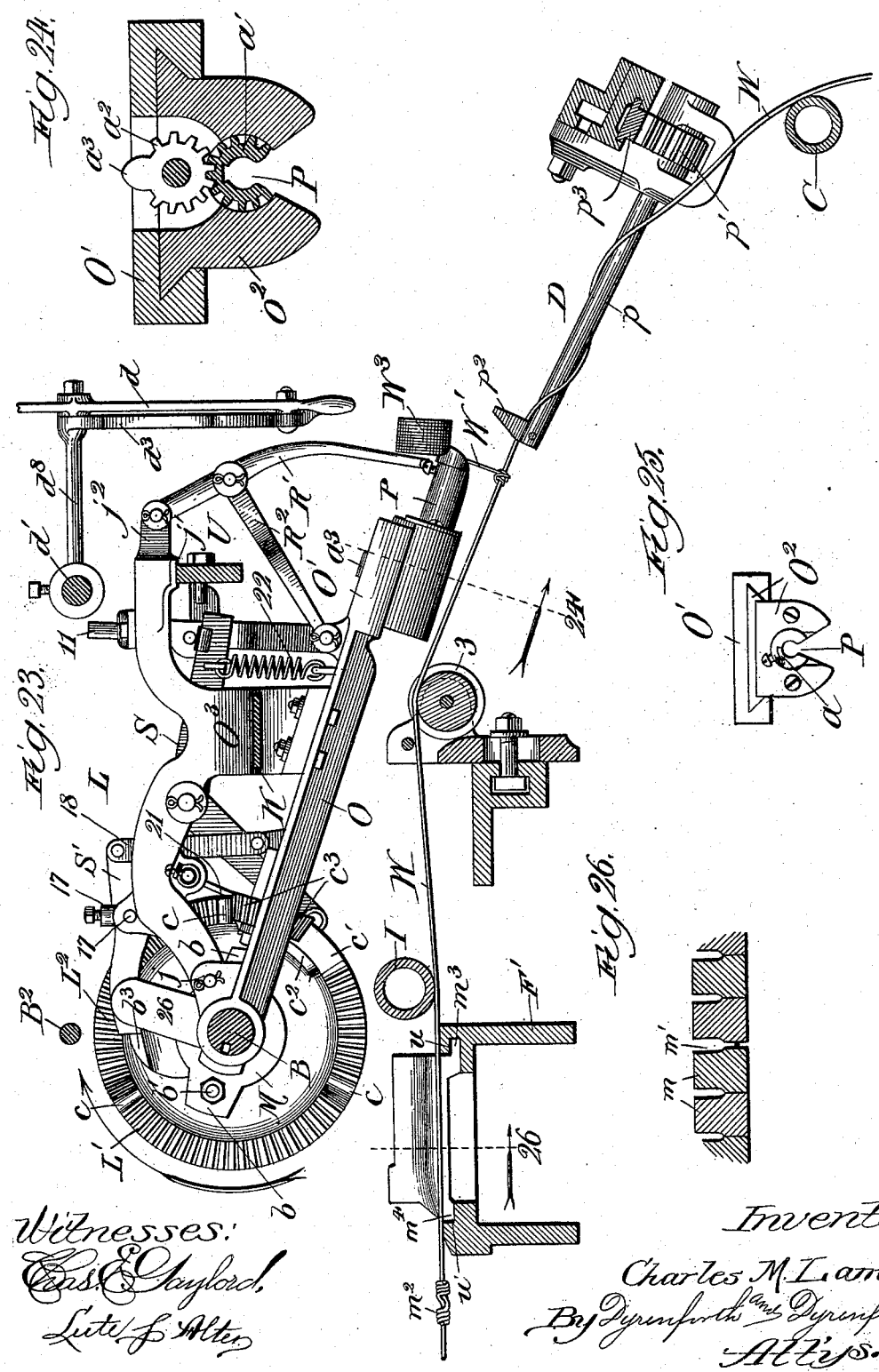

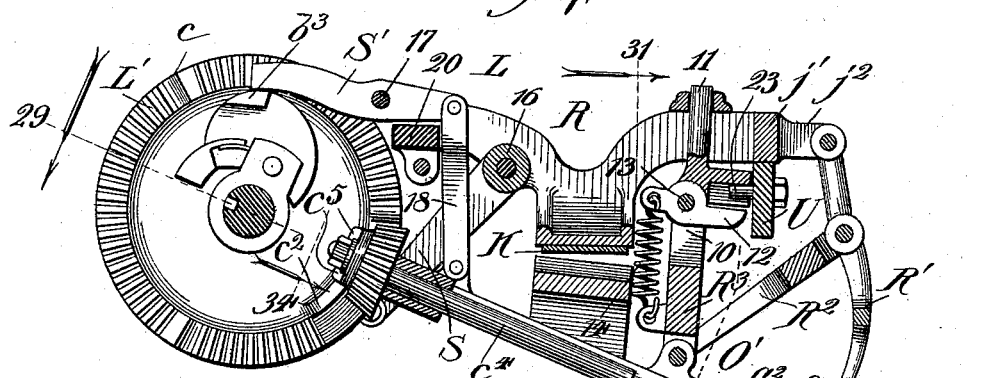

(No Model.) 12 Sheets—Sheet 10.
C. M. LAMB.
WIRE FENCE MACHINE.
No. 534,893. Patented Feb. 26, 1895.
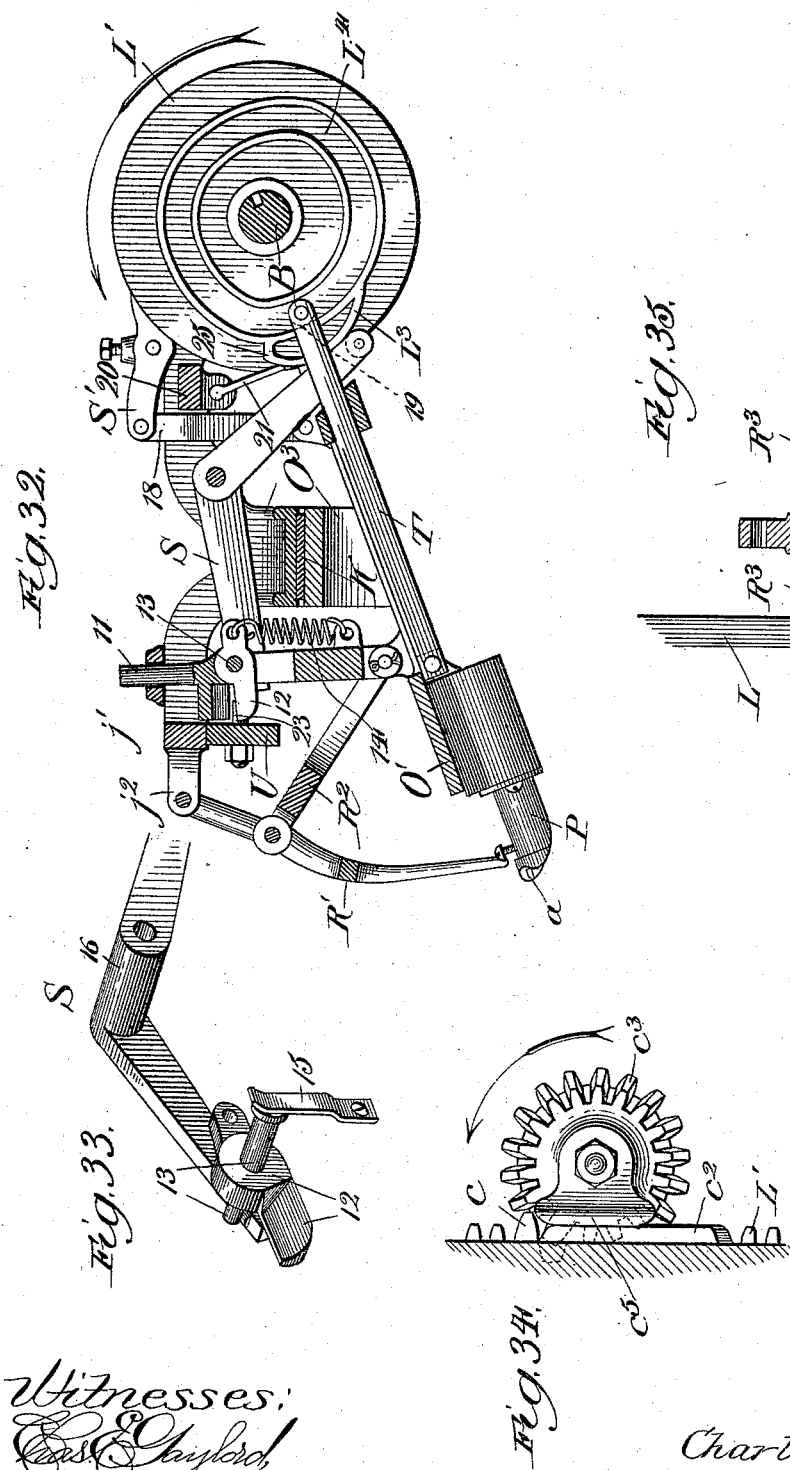
Witnesses:
Chas. E. Gaylord
Lute J. Alter
Inventor:
Charles M. Lamb
By Dyrenforth & Dyrenforth,
Attys.

(No Model.) 12 Sheets—Sheet 11.
C. M. LAMB.
WIRE FENCE MACHINE.
No. 534,893. Patented Feb. 26, 1895.
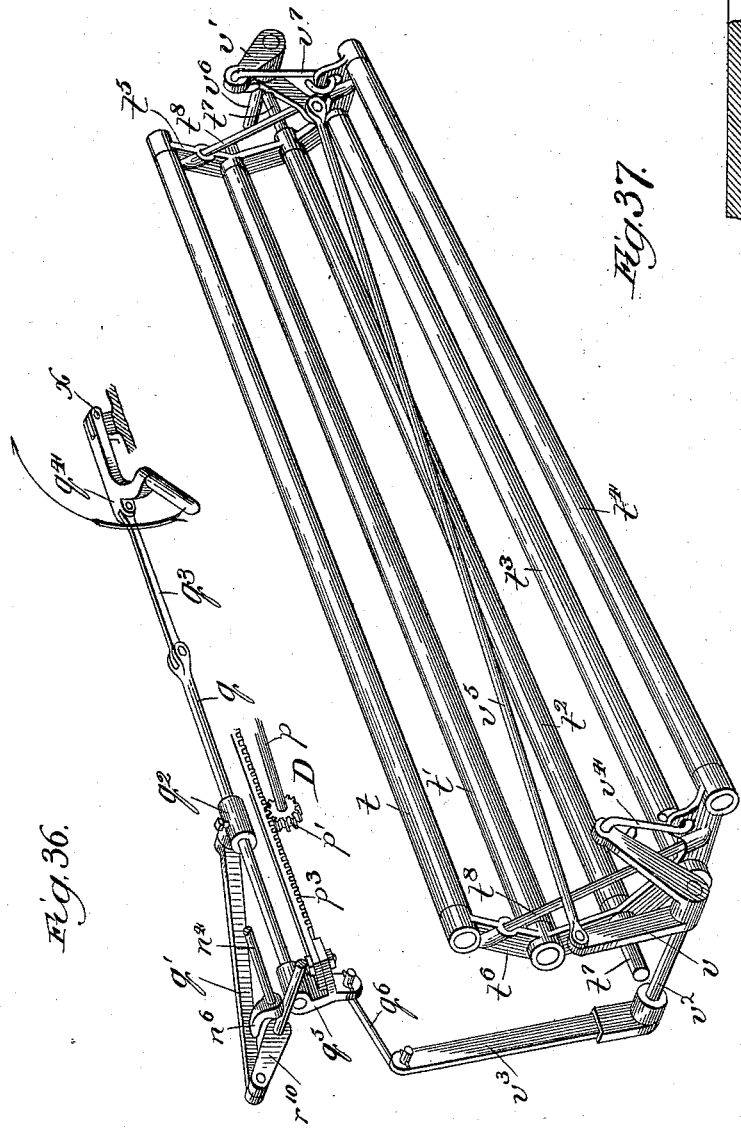
Witnesses:
Inventor:
Charles M. Lamb
By Dyrenforth & Dyrenforth,
Attys

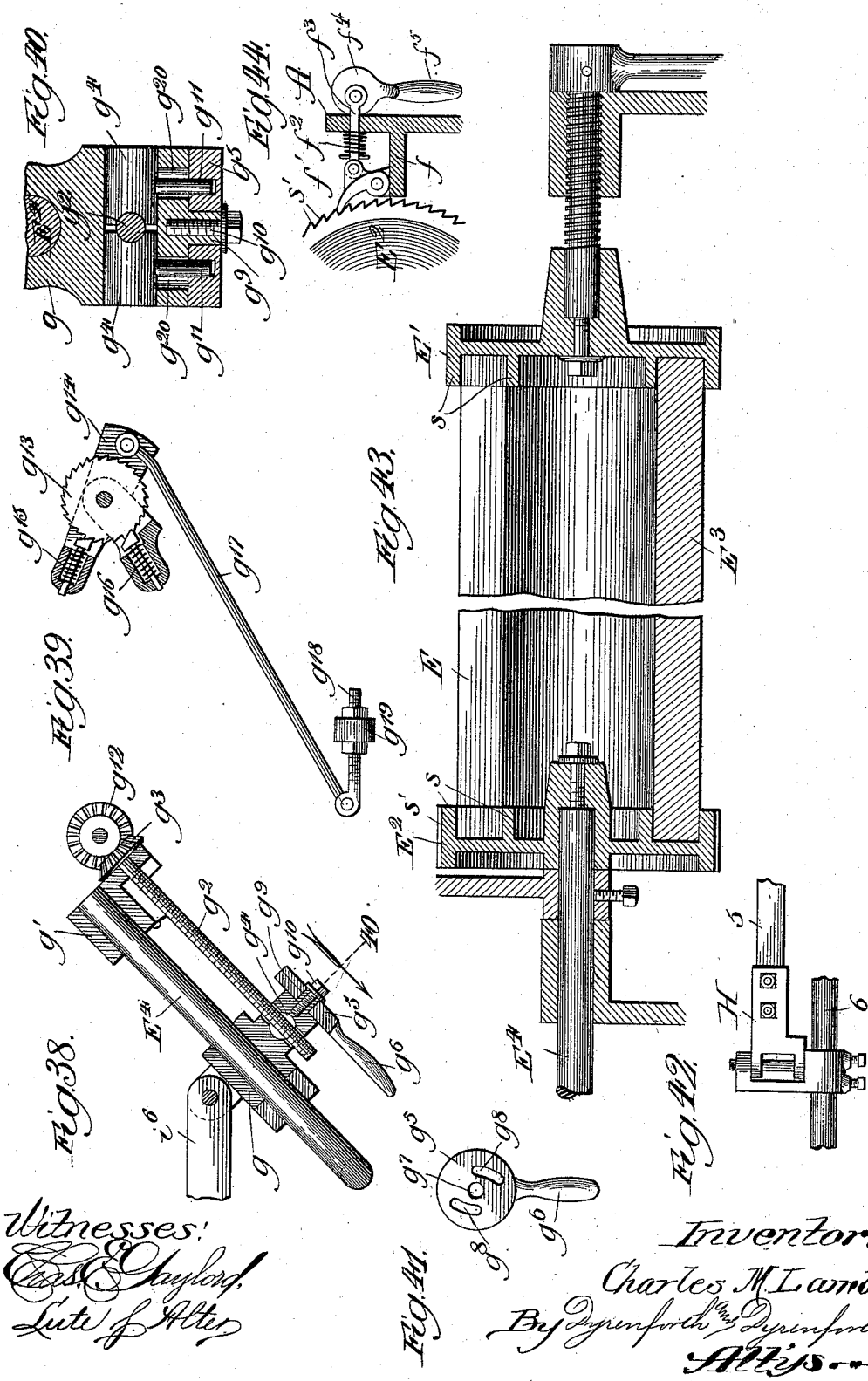

UNITED STATES PATENT OFFICE.

CHARLES M. LAMB, OF ADRIAN, MICHIGAN, ASSIGNOR TO THE PAGE WOVEN WIRE FENCE COMPANY, OF SAME PLACE.

WIRE-FENCE MACHINE.

SPECIFICATION forming part of Letters Patent No. 534,893, dated February 26, 1895.

Application filed July 13, 1894. Serial No. 517,463. (No model.)

*To all whom it may concern:*

Be it known that I, CHARLES M. LAMB, a citizen of the United States, residing at Adrian, in the county of Lenawee and State of Michigan, have invented a new and useful Improvement in Wire-Fence Machines, of which the following is a specification.

My invention relates to improvements in the machine for making wire-fencing for which Letters Patent of the United States No. 414,844 were issued jointly to me and John Wallace Page on the 12th day of November, 1889.

The object of my present invention is materially to simplify and generally to improve the construction and operation of the mechanism of the aforesaid patented machine, especially in the particulars of automatically actuating the coilers to perform their coiling function on the warp-wires; of the tension-device for controlling the finished fence on its way from the warp-wire winding and stringing device to the take-up; of the woof-wire winding and stringing device and its actuating means; of the warp-wire feed from the spools to the point of stringing the woof-wire; and of the take-up.

The generally stated operation of the machine provided with my present improvements is substantially the same as that of the aforesaid patented machine—that is to say, the warp-wires are fed from spools to the take-up mechanism, which winds upon it the finished product of the machine and is actuated intermittingly to take up lengths thereof, and alternates with a woof-wire winding and stringing device actuated, when a finished length of the fencing has been taken up, to travel transversely across the warp-wires, stopping at each and winding around it, by a species of weaving operation, a woof-wire, with which the device is threaded. Moreover, as in the machine constructed in accordance with the aforesaid patent, when it is employed for manufacturing the sinuous construction of fencing, each of the warp-wires is first coiled throughout a suitable portion of its length prior to actuating the woof-wire winding and stringing device to wind the woof-wire around each warp-wire, and, in doing so, to string the woof-wire across the warp-wires just in advance of the termination of each coil; and when the woof-wire has been thus applied, the coilers are relieved of the warp-wires, and the feed is actuated to pay from the spools and feed toward the coilers a predetermined length of warp, to the extent of which feed the take-up winds upon itself the finished length of the fencing.

My improved machine is illustrated in all its details in the accompanying drawings, in which—

Figure 1 shows the machine by a view in side elevation. Fig. 2 is a similar view of the same, but presenting the opposite side of the machine; Fig. 3, a longitudinal vertical section taken at the line 3 on Fig. 4 and viewed in the direction of the arrow; Fig. 4, a broken plan section taken at the line 4 on Fig. 3 and viewed in the direction of the arrow; Fig. 5, a broken section, taken at the line 5 on Fig. 9 and viewed in the direction of the arrow; Fig. 6, a broken section taken at the line 6 on Fig. 3 and viewed in the direction of the arrow; Fig. 7, a broken view showing, in front elevation, the primary hand-operated controlling means for the woof-wire winding and stringing device; Fig. 8, a broken view showing, in plan, the clutch-device for reversing the direction of travel of the shuttle; Fig. 9, a section taken at the line 9 on Fig. 5 and viewed in the direction of the arrow; Fig. 10, a view showing the main shaft in section loosely carrying a belt-pulley having a central disk-head from the inner face of which project studs for operating the spring-abutment on the cam-gear actuating pinion; Fig. 11, a section taken at the line 11 on Fig. 14 and viewed in the direction of the arrow. Figs. 12 and 13 are perspective views of the spring-abutment detail for the driving-shaft. Fig. 14 is a longitudinal section of a pinion taken at the line 14 on Fig. 9 and viewed in the direction of the arrow; Fig. 15, a broken view in elevation of the female portion of an abutment-head on a crank-shaft. Figs. 16 and 17 are broken perspective views respectively of the male and female co-operating abutment-heads. Fig. 18 is an end view of the pinion for actuating the coiler and tension mechanism; Fig. 19, a sectional view showing in elevation the inner face of the cam gear-wheel on its shaft, for actuating the coilers, the clamp-feed and the take-up, and showing its cam-connection with a reciprocating clamp actuating bar; Fig. 20, a broken section taken at the line 20 on Fig. 21 and viewed in the direction of the arrow; Fig. 21, a broken plan section showing the rear trip-mechanism of the clamp-feed device; Fig. 22, a section taken at the line 22 on Fig. 21 and viewed in the direction of the arrow; Fig. 23, an enlarged section of the forward half or portion of the machine taken at the line 23 on Fig. 4 and viewed in the direction of the arrow; Fig. 24, a section taken at the line 24 on Fig. 23, and viewed in the direction of the arrow; Fig. 25, a view of the outer or forward end of the needle-device; Fig. 26, a section taken at the line 26 on Fig. 23 and viewed in the direction of the arrow; Fig. 27, a section taken at the line 27 on Fig. 29 and viewed in the direction of the arrow, showing the mechanism of the woof-wire winding and stringing device or "shuttle;" Fig. 28, a broken view of the needle-rotating beveled gear showing the spring-stop or abutment thereon; Fig. 29, a section taken at the line 29 on Fig. 27 and viewed in the direction of the arrow; Fig. 30, a section taken at the line 30 on Fig. 27 and viewed in the direction of the arrow, but showing the lower jaw of the shuttle in its raised position; Fig. 31, a section taken at the line 31 on Fig. 27 and viewed in the direction of the arrow, but showing the lower jaw of the shuttle in its raised position; Fig. 32, a section taken at the line 32 on Fig. 29 and viewed in the direction of the arrow; Fig. 33, a broken perspective view showing the bell-crank lever for raising the lower jaw of the woof-wire winding and stringing-device and the trip-finger for dropping it; Fig. 34, a diagram-section taken at the line 34 on Fig. 27 and viewed in the direction of the arrow; Fig. 35, a broken section taken at the line 35 on Fig. 30 and viewed in the direction of the arrow; Fig. 36, a perspective view, in the nature of a diagram, showing the forward slack and tension device for the fencing, as it becomes completed, the connection thereof with the primary operating handle and of the latter with the trip-mechanism for releasing the cam-gear which thereupon actuates the coilers, the feed and the take-up; Fig. 37, a broken view in elevation, partly sectional, showing the rack and pinion mechanism for operating the coilers; Fig. 38, a broken section, taken at the line 38 on Fig. 4, viewed in the direction of the arrow and enlarged, and showing the automatic take-up compensating device; Fig. 39, a broken section taken at the line 39 on Fig. 4, viewed in the direction of the arrow and enlarged; Fig. 40, a section taken at the line 40 on Fig. 38 and viewed in the direction of the arrow; Fig. 41, a view in elevation of a cam-slotted head for holding in place the divided nut of the aforesaid compensating device; Fig. 42, a broken plan view of one side of the guide for the fencing to the take-up; Fig. 43, a longitudinal section of the take-up drum, taken at the line 43 on Fig. 4, viewed in the direction of the arrow and enlarged; and Fig. 44, a section taken at the line 44 on Fig. 4, viewed in the direction of the arrow and enlarged.

A is the frame of the machine, shown as of general rectangular form and adapted to support the various parts.

B is the main shaft, journaled in suitable bearings on the opposite sides of the upper portion of the frame near its front end and carrying a belt-pulley $w$, at which to connect it by a belt $w'$ with an overhead driving-shaft (not shown). B' is a counter-shaft similarly journaled in the frame A, but on a lower plane than and in advance of the shaft B; and it carries the large gear-wheel $r$ having formed on its inner face a cam-guide or groove $r'$ extending about the shaft, and on its hub-portion a mutilated, or half, beveled gear $r^2$. (See Fig. 19.) This hub-gear $r^2$ has a brake-shoulder and meshes with a beveled pinion $r^3$ having a brake-shoulder $r^{11}$ (Fig. 18) to co-operate with that on the hub-gear and is supported on a short rotary shaft $r^4$ supported in suitable bearings to extend horizontally lengthwise of the machine toward the forward end thereof and carrying, to rotate with it, a cylindrical head $r^5$ (Fig. 16) provided on its face with a segmental eccentric abutment $r^6$, the shaft also supporting, loosely, a hollow cylindrical head $r^7$ (Fig. 17), adapted to envelop the head $r^5$ and containing an internal segmental eccentric abutment $r^8$; and the head $r^7$ has a sleeve-extension $r^9$ terminating in a crank-arm $r^{10}$. This crank-arm $r^{10}$ is connected, by a link $q'$ (see particularly Fig. 36) through the medium of an adjustable sleeve $q^2$, with a horizontal rod $q$, extending transversely of the machine at, or parallel with, its front and connected from one end, by a link $q^3$, with an operating handle, or lever, $q^4$, fulcrumed at $x$.

C is a tension-device located at the front end of the machine and comprising a series of cylindrical and preferably tubular bars $t$, $t'$, $t^2$, $t^3$ and $t^4$, journaled at their opposite ends to extend, approximately, in the arc of a circle, in end-pieces $t^5$ and $t^6$ provided with suitable bearings and which are journaled, near their longitudinal centers, by a shaft or trunnions $t^7$, in opposite sides of the frame A below the rod $q$. The right-hand end of the rod $q$ is fastened in a movable head $q^5$ connected by a link $q^6$ with a crank-arm $v^3$ on a rock-shaft $v^2$ carrying a bell-crank $v$ connected from one arm by a link $v^4$ with the end-piece $t^6$ near its inner end, and from its opposite arm, by a link-rod $v^5$ with one arm of a bell-crank $v'$ on a rock-shaft $v^6$ journaled adjacent to the end-piece $t^5$; and the other arm of the bell-crank $v'$ is connected by a link $v^7$ with the end-piece $t^5$ near its inner end.

As shown most clearly in Figs. 3 and 36, the approximately arc-shaped end-pieces $t^5$ and $t^6$ are reinforced by brace-rods $t^8$.

It will be seen that when, by manipulating the handle $q^4$ to turn it in the direction indicated by the arrow on Fig. 36, the rod $q$ is pulled accordingly, the crank-arm $v^3$ will be tilted to rock the shaft $v^2$ and its bell-crank $v$, and, through the medium of the link-rod $v^5$, also the bell-crank $v'$, in the direction for tilting the device C backward, (or toward the rear end of the machine) on its trunnions $t^7$; and that turning the handle $q^4$ in the opposite direction accordingly returns the device to its normal position, in which it is represented in the drawings. This backward tilting of this tension-device has, as will hereinafter be explained, the effect of slackening the warp-wires that pass about it on their way from the feed-spools to the take-up device, to permit the latter to take up the slack; and it is attended with the operation of the coilers in their direction of rotation to uncoil from them the warp-wires. As in the said formerly patented machine coilers D may be provided, at the distances apart corresponding with the warp-wires W. Each coiler comprises a rod $p$ journaled in a suitable bearing in the forward end of the machine to extend backward at an upward inclination corresponding, at least approximately, with the downward inclination toward it of its warp-wire, and carrying at its inner or rear end a finger $p^2$ extending at a right-angle from it, and at its outer end a pinion $p'$, all the pinions of the several coilers meshing with a horizontal rack $p^3$ supported above the pinions to extend and be reciprocated transversely across the front end of the machine and connected at one end, for reciprocating it, with the head $q^5$. Thus, as will be seen, when the handle $q^4$ is turned in the direction indicated by the arrow on Fig. 36, a further result than that of tilting backward the tension-device C for the consequent slacking effect on the warp-wires, is to turn the coilers D backward, or in the direction of uncoiling the wires W from them. It remains to be seen how, according to my improvement, the coilers may be thereafter actuated automatically in the opposite direction to coil upon them the warp-wires.

On the outer right-hand end of the shaft B, which rotates continuously in one direction, is loosely journaled a secondary belt-pulley $w^2$ connected by an endless belt $w^3$ with a pulley on the overhead driving-shaft (not shown); and at the center of the pulley $w^2$ is a disk-head $w^4$ provided on its inner face with inward projecting rollers $w^5$ on studs, shown as three in number at equal distances apart on a circle described about the center of the disk. Also loosely on the shaft B, between the pulleys $w$ and $w^2$, is a pinion $o$ (see Figs. 5 and 14) meshing with the gear-wheel $r$ and provided with a head $o'$ at its outer end, containing a peripheral recess $o^2$ in which is pivotally supported a spring-controlled abutment $o^3$ having a lateral rib $o^4$ terminating in a depending head $o^5$, the abutment terminating at its forward end in a head $o^6$. The normal tendency of the spring $o^7$, which controls the pivotal abutment $o^3$, is to maintain it in a position wherein it presents its head $o^5$ to the path of the studs $w^5$ on the rotating pulley $w^2$, whereby the one which strikes the head first will rotate the pinion $o$ and thus revolve the gear $r$. The abutment is normally forced out into the position in which it is illustrated in Fig. 9, (wherein its head $o^5$ and rib $o^4$ are below the path of the studs $w^5$, so that the latter clear the abutment and thus avoid rotating the pinion $o$) by an eccentric finger $n'$ on a rock-shaft $n$, journaled in suitable bearings on the right-hand side of the machine (regarded from its front end) and terminating at its forward end in a fork $n^2$ having a pin-bearing for a universal or ball and pin joint $n^3$ on one end of a rock-shaft $n^4$, which inclines thence downward and forward to a point adjacent to the crank $r^{10}$ where it is supported in a bearing $n^5$ and carries a crooked finger $n^6$ extending into the path of the crank. When, therefore, the handle $q^4$ is turned toward the left, as described, to drop the tension-device C and actuate the rack $p^3$ to rotate the coilers D, the crank $r^{10}$, in its primary partial revolution by such turning of the handle, strikes the finger $n^6$ and rocks the shaft $n^4$, and thereby also the shaft $n$ to turn the finger $n'$ up out of the path of the spring-abutment $o^3$, the spring $o^7$ of which then immediately withdraws it on its pivot into the recess $o^2$ to present its head $o^5$ to the path of the next adjacent stud $w^5$ on the continuously rotating loose pulley $w^2$, which then thus rotates the pinion $o$, till it has caused the gear-wheel $r$ to make a complete revolution. After the initial turning of the handle $q^4$ this resultant rotation of the gear-wheel automatically produces the following operations, namely: that of actuating the warp-wire feed, hereinafter described, to feed to the coilers D a predetermined length of the warp-wires, and simultaneously that of actuating the take-up drum E (most clearly shown in Fig. 43) to rotate through a sufficient portion of a revolution to wind upon itself the same length of the finished article as the length of additional warp-wire fed to the coilers, and, while the take-up is so operating, gaging the extent of its rotation according to its increase in diameter by the accumulation of windings upon it; then that of completing the revolution of the crank $r^{10}$ to withdraw the rack $p^3$ to its initial position and, by its return-movement, actuate the coilers D to coil upon them the fed warp-wires; and trip the stop-finger $n'$ on the shaft $n$ to present it again to the abutment $o^3$ when the gear $r$ has completed its revolution; and while the feed and take-up are so operating, the woof-wire winding and stringing device, or "shuttle," is being returned automatically to its initial position whence it may be started by hand-release to perform its function as soon as the coilers have operated to coil upon them the fed length of the warp-wires.

Following is a description of the various mechanisms and their operations in performing the several functions thus stated:

F (Fig. 4) is the feed for the warp-wires W, which are supplied from spools (not shown, but the same as in the aforesaid former patent). This feed comprises the following construction: Two clamp-supporting bars F′ and F², each of the construction represented in Fig. 23, extend transversely across the machine from one side thereof to the other, the bar F′ being rigidly fastened at its ends to the top of the said sides, while the bar F² rests, at its ends, upon the sides of the machine and is adapted to be reciprocated back and forth with relation to the bar F′. On each bar is a series of abutting clamps $m$ (see Fig. 26) each squared in cross-section at the sides near its base and reduced in diameter thence upward, so that when the clamps abut at the sides of their base-portions, interstices $m'$ are afforded between them extending throughout about one-half their vertical thickness to permit enlargements or joints (like the joint $m^2$ shown in Fig. 23) formed in the warp-wires W to pass readily between the clamps and thus avoid obstructing the operation of the machine. Along the rear side of each clamp-bar F′ and F² it is undercut, as indicated at $u$ in Fig. 23, to receive, and confine each clamp $m$ at, a tongue $m^3$ projecting backward from the base of the clamp; the opposite end of the clamp having a bearing $m^4$ extending forward from it, at which it rests in a guide-offset $u'$ in the opposite side of the clamp-bar. At one end of the series of clamps $m$ on each bar F′ and F² (namely the end at the left-hand side of the machine regarded from the front) it carries a transverse bearing $m^5$ for set-screws $m^6$, by which to adjust the clamping force of the clamps; and of the clamps $m$ on the bar F′, that at the opposite end of the series has pivotally connected with it a horizontally extending lever $m^7$ carrying at its outer end a backward projecting cam-head $m^9$, while the corresponding clamp on the bar F² has pivotally connected with it a similarly extending lever $m^8$ carrying at its outer end a forward projecting cam-head $m^{10}$.

In each side of the frame A is a longitudinal slot $y$ (Fig. 20) having pivotally supported in it a spring-controlled dog $l$, which extends from its pivotal end underneath the top of the frame-side and protrudes at its hook-end $l'$ through a coincident slot $y'$ (Figs. 4 and 20) in said side and is adapted to obstruct the bar F² at its forward edge; the spring-dog being provided at its forward end with a downward and laterally extending leg $l^2$ terminating in an outward projecting forward-inclined foot $l^3$. On the right-hand end of each of the clamp-bars F′ and F² it is provided with a bearing $k^4$, the one having a lever $k$ pivoted between its ends to the bearing and carrying at its inner end a backward-projecting cam-head $k^2$ opposed to the cam-head $m^9$, and the other bearing $k^4$ having a lever $k'$ pivoted thereto between its ends and carrying at its inner end a forward-projecting cam-head $k^3$ opposed to the cam-head $m^{10}$. It is to be observed that these levers carrying the opposing cam-heads are in the nature of toggles, and afford cam-lever tighteners for the clamps $m$—that is to say when the cam-heads are brought to their relative heel-abutting positions shown on Fig. 4 of the heads $k^2$ and $m^9$, the clamps $m$ controlled by them are released and allowed to be sprung apart by the resilience of the wires W extending between the clamps and which wires, to afford the desired resiliency in them, should be directed into the interstices $m'$ at a very slight lateral angle (so slight that it can not be represented in the scale observed in Fig. 4); and when the cam-heads are brought to their relative toe-abutting positions shown of the heads $k^3$ and $m^{10}$, the clamps $m$ controlled by them are tightened against the warp-wires.

The purpose is to tighten the clamps on the bar F² and move it forward to feed the warp-wires between the clamps on the bar F′ while they are spread apart or released, then to tighten upon the wires the last-named clamps while the bar F² returns to its initial or normal position, thus to prevent the possibility of its dragging backward on the warp-wires; and when the bar F² has reached its rearmost position of rest, its clamps are to be tightened against the wires, thus to be prepared for the next wire-feeding operation, and the clamps $m$ on the bar F′ released for the same purpose. To these ends the reciprocable bar F² is connected from one end by a pitman $i$, (see particularly Figs. 1 and 4) having a slotted head $i'$ at which it engages the bar, with the gear-wheel $r$ at an eccentric pivot-bearing $i^2$ on its outer face, two of which pivot-bearings are shown differentially eccentric to the axis of the gear-wheel to vary, at will, the extent of throw of the pitman and thus the extent of feed of the wire. A similar pitman-connection $i$ is shown in Fig. 4 at the opposite end of the clamp-bar F² with a crank on the adjacent end of the shaft B′ of the large gear-wheel, the crank having two pivot-bearings $i^2$ to correspond with those on the wheel $r$. The cam-groove $r'$, or cam-guide on the inner face of the gear-wheel $r$ engages a thimble $h^4$ on the adjacent end of a bar $h$ reciprocably supported on the side of the frame A and provided in its upper side near the forward end with a socket $h'$ (see Figs. 4 and 19), in which is confined the outer end of the cam-lever $k$, and with an abutting-head $h^2$ extending backward from the socket, the bar $h$ being provided near its opposite end, where it extends backward beyond the outer end of the cam-lever $k'$, with a forward projecting abutting-head $h^3$.

When the wheel $r$ begins to rotate, it first takes up the slight lost motion in the slotted heads of the pitmen $i$ and employs it to bring downward projecting studs $i^5$ supported on the inner sides of the pitmen to bear against the feet $l^3$ of the dogs $l$, thereby depressing them from the path of the clamp-bar $F^2$. Then, by the time the studs $i^5$ have cleared the feet $l^3$, the pitmen will have advanced the clamp-bar over the plane of the dogs; and they continue to advance it to the end of the forward throw of the pitmen, thereby accordingly feeding the warp-wires W. At the end of this forward throw the cam-guide $r'$, owing to its form, illustrated, begins to force the bar $h$ backward and continues the movement thereof till the engagement of the socket $h'$ turns the lever $k$, and, through the abutting cam-heads $k^2$ and $m^9$, the lever $m^7$, to force the clamps on the bar $F'$ together to tighten them against the warp-wires; and just as these clamps are so tightened, the abutting-head $h^2$ strikes the end of the lever $k'$ on the then advanced bar $F^2$ and throws it back, thereby, through the consequent co-action of the cam-heads $k^3$ and $m^{10}$, turning the lever to loosen the clamps $m$ it controls and permit the back-stroke of the pitmen $i$, in the continued rotation of the wheel $r$, to freely return the clamp-bar $F^2$ to its normal rear position, where it remains temporarily at rest owing to the stoppage of the wheel $r$ by a trip-lug $z$, on its inner side near the periphery (see Fig. 19) encountering the crank-finger $n'$ to turn it, by its rock-shaft $n$, into the path of the spring-abutment $o^3$ on the loose pinion $o$, thereby removing the abutment out of the path of the studs $w^5$ on the loose pulley $w^3$; but just before the stoppage of the gear-wheel $r$, and immediately after the clamp-bar $F^2$ has reached its rearmost position, the cam-guide $r'$ operates on the thimble $h^4$ to return the reciprocable bar $h$ to its forward position, in reaching which the socket $h'$, by its engagement with the cam-lever $k$, turns it to release or loosen from the warp-wires the clamps on the bar $F'$ while, simultaneously, the abutting-head $h^3$ strikes the cam-lever $k'$ and throws it forward, thereby tightening the clamps $m$ on the bar $F^2$ against the warp-wires, thus preparing it to feed them, as already described, again when the wheel $r$ is again brought into action. This continued movement of the bar $h$ after the clamp-bar $F^2$ has reached its rearmost position of rest, is, of course, produced by the final portion of the rotation of the gear-wheel $r$, which necessarily continues the backward throw of the pitmen $i$; but this is taken up by the elongated slots $i$; in their heads, so that the rear clamp-bar is not disturbed or strained thereby.

Simultaneously or about simultaneously with the feed of warp-wires W by the advancement of the rear clamp-bar $F^2$, the take-up drum E is actuated. The construction of this drum is very similar to that of the same part shown and described in the aforesaid patent. It comprises two disk-heads E' and $E^2$ suitably journaled in the sides of the frame A, the journal of the head E' being screw-threaded, as clearly shown in Fig. 43, and adapted to be turned by a crank to move the head back and forth with relation to the other head for the purpose of freeing and compressing the ends of the bars $E^3$, respectively to collapse and tighten the drum, the body of which is formed by these bars, they having the shape, in cross-section, of segments the ends of which are confined between circular concentric flanges $s$ on the inner faces of the heads; and the edges of the segmental bars are matched to fit one against the other in a manner to afford a cylindrical surface to the drum.

The take-up drum journal on the head $E^2$, which is provided with a circumferential ratchet $s'$, is turned, beyond the head, to a right-angle to form a crank-arm $E^4$ (Figs. 1 and 38) carrying a sliding head $g$ connected by a pitman $i^6$ with the end of the reciprocable clamp-bar $F^2$ at which the slotted head of a pitman $i$ is attached. At the outer end of the arm $E^4$ it carries a stationary bearing $g'$ for one end of a threaded shaft $g^2$, on which end is provided a beveled gear $g^3$, the opposite end of the shaft working in a cylindrical transversely divided nut $g^4$ supported to oscillate in a rear extension of the sliding head $g$, and held by a disk-head $g^5$ having a handle $g^6$ and provided at opposite sides of its center, where it has a perforation $g^7$, with oppositely curved cam-slots $g^8$. The head $g^5$ seats at its center $g^7$ over a stud-projection $g^9$ on the outer end of the extension of the sliding head $g$ and is fastened by the head of a set-screw $g^{10}$ inserted through it into the stud-projection; and pins $g^{11}$ (Fig. 40) extend at right-angles from the nut-sections, one from each, through enlarged openings $g^{20}$ in the rear extension of the bearing $g$, and enter the cam-slots $g^8$ on the head $g^5$, turning of which in one direction thus forces the nut-sections endwise toward each other, to hug the screw $g^2$, while turning the head in the opposite direction spreads the nut-sections apart to free the screw. On the head $g'$ is journaled, in suitable bearings, a beveled gear $g^{12}$ in mesh with the beveled gear $g^3$ and backed by a circumferential ratchet $g^{13}$; and on the shaft of the beveled gear $g^{12}$ is loosely journaled a rocking arm $g^{14}$ carrying a spring-dog $g^{15}$ (Fig. 39) to engage the ratchet for turning the gears, the ratchet being stopped by a spring-dog $g^{16}$ supported on an extension of the head $g'$. At the rear end of the rocking-arm $g^{14}$ is pivoted one end of a link $g^{17}$ pivotally connected at its opposite end with a threaded eye-bolt $g^{18}$ adjustable by means of clamp-nuts in a rigid bearing $g^{19}$ on the frame A.

The rear end of the side of the frame A in which the head $E^2$ of the take-up drum E is journaled is turned inward to afford a bearing $f$ for pivotal dogs $f'$ engaging the ratchet-teeth $s'$ on that head to stop back-turning of the drum, the dogs being yieldingly held in engagement with the ratchet-teeth by springs $f^2$ on stems $f^3$ (see Fig. 44) controlled by a cam-head $f^4$ having a handle $f^5$ and by which to retract the dogs $f'$ from the ratchet when it is desired to reverse the take-up drum—an operation only performed, and then slightly, preparatory to severing its accumulated windings of the finished fencing from the fencing still on its way to the drum. On the journal of the head $E^2$ of drum E is tightly fastened a spring-dog carrying head $E^5$ to turn with the journal and engage its dogs with the ratchet $s'$ to turn forward the take-up drum by each forward stroke of the pitman $i^6$.

The mechanism described as connected with the arm $E^4$ affords a species of compensating device for the increasing diameter of the take-up. It is to be remembered that the feed F feeds with each operation the same length of warp-wires, so that only a corresponding length of the finished article of the fencing can be taken up each time; and the extent of turning of the drum E through a part of a revolution may not be the same each time the take-up is actuated, for, as the drum increases in diameter by the accumulation upon it of the finished fencing, it requires to be turned less and less for always winding the same length of the finished article. If, therefore, the pitman $i^6$ were caused to describe always the same extent of stroke by being connected permanently with one point on the arm $E^4$, there would never be variation in the forward turning or throw of the take-up drum E. As it is, however, by each advance of the clamp-bar $F^2$ (producing the forward stroke of the pitman $i^6$), the forward turning of the upper end of the link $g^{17}$ on a different center from the center of rotation of the drum rocks the bearing $g^{14}$ forward and causes its dog $g^{15}$ to correspondingly turn the ratchet $g^{13}$ and beveled gear $g^{12}$, thereby turning the beveled gear $g^3$ and the screw-shaft $g^2$ in its nut $g^4$ to raise the head $g$ sufficiently to decrease, in proportion to the increase in diameter of the drum E, the extent of forward throw, by the forward stroke of the pitman $i^6$, of the forward turn of the arm $E^4$ and, with it, that of the dog-carrying head $E^5$ (owing to its being on the journal of which the arm $E^4$ is a part) to turn the take-up drum. Thus, as will be seen, each forward stroke of the pitman $i^6$ slightly raises the head $g$ to bring the outer end of the arm $E^4$ nearer and nearer, as it were, at the beginning of each of its forward throws, to the end of the forward stroke of the pitman, whereby the extent of turning of the drum is gradually decreased in, or substantially in, accordance with the increase in its diameter, till, when it has its complement of accumulations upon it of the finished fencing $W^2$, the head $g$ may have been raised nearly to the upper end of the arm $E^4$. Then, to reset the head for the original diameter of the drum E, when it has been relieved of its roll, (an operation performed as described in the aforesaid patent, by turning the threaded journal of the head $E'$ to withdraw the latter and release the bars $E^3$ to permit them to collapse and be pulled out of the roll of fencing) to start afresh the operation of the machine, the head $g^5$ is turned to spread the nut-sections apart and permit the head $g$ to be slipped down into place at the base of the bend in the arm $E^4$. The rising and falling segmental racks of the patent, referred to, were designed for the same purpose as my present improved compensating device, but are not so effective as the latter, since it enables the winding on the drum E to be of any desired degree of looseness, instead of an increasing tightness toward the center. In fact, by my improvement, the adjustment may be such as to render the windings toward the center of the accumulations of fencing $W^2$, or those nearest the surface of the drum, looser than the outer ones.

In the first half of the rotation of the large gear-wheel $r$, starting from the point of engagement, represented in Fig. 19, of the thimble $h^4$ with the cam-groove, whence it primarily backs the bar $h$, by the action of the more expanded section of the cam-groove (the less expanded section, of course, serving to return the said bar) the half-pinion $r^2$ completely rotates the beveled pinion $r^3$ and its shaft $r^4$; but inasmuch as the throw toward the left, at the initial start of the operation of the machine, of the handle $q^4$ has accordingly turned the head $r^7$ and removed its inner abutment some distance in a circle beyond the abutment $r^6$ on the head $r^5$, the shaft $r^4$ will have made part of its revolution before the abutment $r^6$ reaches and contacts with the abutment $r^8$. Thus the male and female heads $r^5$ and $r^7$ afford what may be termed a lost-motion abutment-device. The coilers D remain, therefore, released from the warp-wires for a short period after so turning the handle $q^4$, during which period the feed takes place; whereupon the abutment $r^6$ reaches the abutment $r^8$ and engages it to complete the rotation of the crank $r^{10}$ to retract the rack $p^3$, turn the coilers in the direction of engaging their end-fingers $p^2$ with the warp-wires and coil the latter about the rods $p$, as shown in Fig. 4, and raise the tension-device C.

By way of a general recapitulation of the construction and operation of the machine, as thus far described, and of describing incidentally further minor details, the following explanation is given: The warp-wires W are fed by uncoiling from spools, as in the aforesaid patent (and which may be imagined to be located at the upper end of the inclined plane indicated by the warp-wire presented to view in Fig. 3); and these wires lead over a tension-device G extending backward and upward from the reciprocable clamp-bar $F^2$ to move with it, this tension-device comprising side-arms $G'$ affording bearings for the opposite ends of two pair of rollers, $G^2$, $G^3$, and $G^4$, $G^5$. The warp-wires are passed from the spools over the rollers $G^5$ (the end-wires being passed under guides 1 on the roller), thence under the roller $G^3$, thence over the roller $G^4$, and thence under the roller $G^2$. From the latter the wires proceed between the clamps $m$ on the bars $F^2$ and $F'$ and under a stationary guide-roller 2 and over guide pulleys 3 journaled in series across the machine near its forward end, below and in alignment with the upward and backward inclined coilers D, and thence about the tension-device C, from which they proceed backward to and under the take-up drum E, to which their ends are suitably fastened, the wires passing, on their way to the take-up, under spur-wheels 4 of a guide H afforded by the spur-wheels journaled on the rear ends of upward and backward projecting arms 5 pivotally fastened at their opposite ends to the lower side-rails 6 of the frame A; so that the weight of the guide H rests, at the spur-wheels 4, upon the warp-wires, the better to guide the latter. The tension on the wires W of the device G tends to straighten them; and in this particular the device G is supplemented by a heavy steel cylindrical roller I resting loosely on the wires across which it extends transversely between the clamp-bars $F'$ and $F^2$ and is free to roll upon them. With the warp-wires thus strung, turning the handle $q^4$ is followed, as described, by dropping the forward tension-device C; operation of the feed F and take-up; raising the forward tension-device C to its normal position, and turning the coilers D to wind about their rods $p$ the warp-wires and thus prepare the latter for having wound upon and strung across them a woof-wire $W'$.

There should here be described a provision for a slight backward movement of the drum E, which often occurs in practice to a great disadvantage if not provided for. The pitch of the teeth of the ratchet $s'$ on the head $E^2$ is about one-half inch, so that when the drum is thrown forward by the dogs on the rocking head $E^5$, and then released to be held by the dogs $f'$, the strain caused by the finished fencing not yet wound on the drum has a tendency to turn the latter backward. This slight backward movement ensues whenever the drum is carried forward to a point where one of the dogs $f'$ is about to engage one of the teeth on the head $E^2$ but does not quite abut against it, thereby producing a lost motion of nearly a quarter inch, which, if not provided for, would carry with it the clamp-bar $F^2$ with the clamps $m$ clamped against the wire W just before the latter are clamped by the clamps on the bar $F'$ by means of the heads $k^2$ and $m^9$, thereby shortening the warp-wires at the top of the finished fence each time that this backward movement of the drum occurs. To avoid this, the opening in the head of the pitman $i^6$, where it connects with the pitman $i$, is made in the form of an elongated slot 40 (see Fig. 21) which should have about three-eighths of an inch play. By this means the pitman $i^6$ can be carried forward the length of the slot 40 by the projection on the inside of the pitman $i$ at the beginning of rotation of the gear-wheel $r$ before it reaches the end of the slide-bearing in the end of the pitman $i$, which carries the clamp-bar $F^2$ and feeds the wires W through between the clamps $m$ on the clamp-bar $F'$. When the clamp-bar $F^2$ has reached the full end of its forward movement and the pitman $i$ starts on its return-stroke, by the continued rotation of the wheel $r$, the lost motion in the bearing of the pitman $i^6$ is thus released and the tension of the finished fencing not yet wound on the drum may draw back any portion thereof necessary for one of the dogs $f'$, which may differentiate in length, to engage a tooth of the ratchet without moving or in any way disturbing the clamp-bar $F^2$.

The function of applying the woof-wires is performed by the woof-wire winding and stringing mechanism, the general construction and manner of operation of which are similar to those of the aforesaid patent, but differ therefrom in matters of detail.

Directly above the main-shaft B is supported a longitudinally reciprocable rod $B^2$ (Fig. 5) having its end nearest the gear-wheel $r$ pivotally connected with a crank-arm $e'$ on a rock-shaft $e$ (Fig. 1) supported in suitable bearings to extend parallel with the length of the machine and having at its forward end a crank-arm $e^2$ connected by a spring $e^3$ with a rigid portion of the frame A; and the opposite end of the rod $B^2$ is supported to slide in a bearing 7 on the adjacent side of the frame A. Depending from the rod $B^2$ from near one end is a rigid arm $e^4$ bifurcated at its lower end to straddle the shaft B; and on the rod toward its opposite end is a spring-controlled depending arm $e^5$, while between the arm $e^5$ and the adjacent end of the rod $B^2$, rigidly depending from the latter, is a clutch-operating arm $e^6$, engaging at its lower end the circumferential groove in an ordinary sliding double-clutch device $e^7$ on the shaft B. This clutch is flanked by beveled pinions $e^8$ and $e^9$ loosely surrounding the main-shaft B and meshing respectively with diametrically opposite points of a beveled pinion $e^{10}$ on one end of a short rotary shaft $e^{11}$ (see Fig. 8) supported in suitable bearings 8 and carrying at its opposite end a drive-pulley $e^{12}$ for one extremity of an endless horizontally traveling belt K, the opposite extremity of which passes about a pulley $e^{13}$ journaled in a pivotal bracket $e^{14}$ depending from the rock-shaft $e$ and engaged by a set-screw $e^{16}$ having its bearing in the adjacent side of the frame A and affording a medium for tightening and loosening the belt K.

When the rod $B^2$ is forced longitudinally in either direction it causes the arm $e^6$ to actuate the clutch $e^7$ to produce engagement of one or the other of the beveled pinions $e^8$ or $e^9$ with the main-shaft B, which is constantly rotating in one and the same direction, while the other pinion remains loose on the shaft; and as these pinions are at opposite sides of the center of the pinion $e^7$, when either is thus clutched to the shaft it turns the shaft $e^{11}$ in the opposite direction from that in which it is turned when the other pinion is so clutched. It is thus that provision is made for automatically reversing the direction of travel of the endless belt K for actuating the woof-wire winding and stringing device or "shuttle" to travel back and forth across the warp-wires, as hereinafter described. Means are also provided and shown in Fig. 7 for controlling the longitudinal reciprocation of the rod $B^2$ by hand, comprising a lever $d$ fulcrumed on a sleeve $d^2$ having a forward-projecting stem $d^3$ (Fig. 23) at or near the center of the front of the machine, the sleeve being on a stationary rod $d'$ extending across it from side to side. From the forward end of the stem $d^5$ there depends a breast-plate $d^3$ terminating at its lower end in a segmental head $d^4$ having a tooth $d^5$ near one end for engagement by a spring-dog $d^6$ on the lever; and from its upper projecting end the lever $d$ is connected by a rod or link $d^7$ with the lower end of the cross-head $e^2$ on the shaft $e$. By these means, on releasing the dog $d^6$, and turning the lever $d$ toward the left, the rod $B^2$ is forced in the same direction to clutch the pinion $e^8$ to the shaft B; and by turning the lever $d$ in the opposite direction the rod $B^2$ is correspondingly forced lengthwise to clutch the pinion $e^9$ to the main shaft. The arrangement is such, that when the lever $d$ is in the position illustrated in Fig. 7 with the dog $d^6$ engaging the tooth $d^5$, the clutch $e^7$ is midway between, or inert with reference to, the pinions $e^8$ and $e^9$, so that then the belt K is at rest.

L is the woof-wire winding and stringing device, or "shuttle," as I term it, and it comprises the following-described construction:

L' is the driving-wheel for the mechanism of the shuttle. It is supported loosely to slide freely on the main shaft B and provided on one face circumferentially with teeth forming a beveled gear $L^2$ having larger teeth $c$, shown as three in number, at equal intervals apart, and a blank space $c'$, back of which, on the face of the wheel, is an arc-shaped flat raised brake-section $c^2$ for the beveled pinion $c^3$ of the needle-shaft $c^4$ (Fig. 27) hereinafter more particularly described, the pinion also having a flat brake-section $c^5$ to co-operate with the brake-section $c^2$, as indicated by the diagram presented by Fig. 34. On the opposite face of the wheel L' is a cam-groove $L^4$ (Fig. 32) for reciprocating the needle to produce the form of knot shown and described in the said former patent, there being at one point on the cam-groove a cam-projection $L^3$ for a purpose hereinafter described.

On the shaft B is keyed a sleeve or head M having at one end two diametrically opposite ears $b$ extending at right-angles from the sleeve and carrying each a stud $b'$ surrounded by a thimble $b^2$ and projecting toward the adjacent side of the wheel L', where it carries a pivotal spring-abutment $b^3$ in a recess in the face of the wheel, and very similar in purpose and construction to the abutment $o^3$ described in connection particularly with Figs. 9, 12 and 13, presenting one end to the path of the studs $b'$ when in its normal withdrawn position and its opposite end to a stop in its normal position, this stop being in the form of a lever, hereinafter described and most clearly shown in Fig. 27.

O is the lower jaw, pivotally mounted at the inner ends of its arms loosely on the mainshaft to bear on the one side of the wheel L' confiningly against the adjacent end of its hub and at the opposite side thereof against the end of the sleeve M. At its outer end, centrally between the arms, the lower jaw O carries a head O' (Figs. 24 and 25) having a longitudinal dovetailed recess in its under side to receive and hold reciprocably the correspondingly dovetailed bearing $O^2$ for the longitudinally slotted needle P having the eye $a$ in its outer extremity, into which to insert the end of the coil $W^3$ of woof-wire W'. This needle is rotatably supported in its bearing to be reciprocated with the latter and is surrounded in the portion of its body within the bearing by a series of elongated cog-teeth $a'$ (Fig. 27) with which meshes a pinion $a^2$ having an equal number of similar teeth and an extra larger tooth $a^3$ to enter the slot of the needle in each revolution of the latter, the pinion $a^2$ being fast upon the outer end of the rotary shaft $c^4$, to engage the needle-teeth from above and work in coincident openings in the head O' and bearing $O^2$, and the shaft $c^4$ being journaled toward its opposite ends in bearings, as shown, to incline downward toward its forward end.

On the upper side of the lower pivotal jaw O is the upward-projecting concave portion of a clamp $O^3$ for engaging, with its counterpart, hereinafter described, the lower section of the endless traveling belt K. (See Fig. 6.)

R is the rigid upper jaw represented as two pairs of bent arms extending in opposite directions, lengthwise of the jaw O, from a depending approximately central body-portion forming the upper depending convex member of the clamp $O^3$, and between the two members of which the lower section of the belt K extends. At the inner ends of the backward extending arms of the upper jaw, they flank the wheel L' and are connected with bearings $j$ on the arms of the lower jaw near the shaft B; and at their outer ends the arms of the upper jaw are rigidly joined by a cross-bar $j'$, from the center of which there projects forward a nose $j^2$ having pivotally connected with it a kicker-finger R', linked by a yoke $R^2$, from a point between its ends, with the lower jaw, whereby when the latter is raised, as hereinafter described, the free end of the kicker-finger is forced forward by the yoke to bear against the coil $W^3$, and is retracted by the drop of the lower jaw, as and for the purpose hereinafter described.

$R^3$ is a breast-plate, journaled at its lower expanded end, as shown in Figs. 27, 30 and 31, upon the lower jaw O just back of the needle-bearing, and having in its upper portion an opening 10 and at its upper end a guide-pin 11 passing upward through the upper jaw; and in the opening 10 is pivoted a trip-finger 12 on a longitudinally reciprocable pin 13 supported in the breast-plate $R^3$ to extend across the opening 10 therein, whereby the trip-finger 12 may protrude beyond its front and rear faces, at the latter of which the trip-finger is controlled by a spring 14 tending to return it to its normal position, in which it is represented in Fig. 27, the reciprocation of the pin 13 being resiliently controlled by a spring 15 bearing against the head of the pin.

S is a bell-crank lever having an offset 16 at the junction of its arms (see Fig. 33), and at which it is fulcrumed between the rear arms of the jaw R in position to cause the rear arm of the bell-crank to extend into the path of the cam $L^3$ on the wheel $L'$ and the forward arm thereof to extend, near its extremity, under the protruding end of the pin 13 opposite the headed end of the latter and afford a lifting-bar for the lower jaw, actuated against the resistance of a spring 22 connected with its forward end and tending to return it to its normal position.

$S'$ is a stop-lever, fulcrumed at 17, to project at its rear end into the path of the spring-abutment $b^3$ on the wheel $L'$ and pivotally connected from its forward end, by a link 18, with the lower jaw O adjacent to the wheel.

The reciprocable needle-bearing $O^2$ has connected with it, at its rear end, a stem T carrying at its rear end a thimble 19 engaging the cam-groove $L^4$ on a side of the wheel $L'$; and from the upper jaw, at the center of a cross-bar 20 thereon, there depends into the path of the cam $L^3$ a spring-dog 21, serving a purpose hereinafter described.

Across the machine, near its front end, there extends, transversely, the rigid bar U, affording a track on which bears the cross-bar $j'$ of the upper jaw R; and on this track are provided, at intervals apart to coincide or correspond with the warp-wires W, inward or backward projecting pins 23 in the path of travel of the trip-finger 12.

Immediately after each operation of the feed F and take-up, and resultant turning of the coilers D to coil upon them the fed warp-wires, the shuttle L operates to drop its lower jaw and with it the slotted needle over the first warp-wire (or that nearest the right-hand side of the machine, regarded from the front), then to rotate the needle, meantime reciprocating it, and thus twist the woof-wire from the coil $W^3$ about that warp-wire; then to raise the lower jaw and the needle from the warp-wire and travel to the next warp-wire, stringing the woof-wire across to the latter, where the knotting action is repeated; and so on to the last of the series of warp-wires, whence the shuttle is automatically returned to its initial position. These operations are produced as follows:

In the initial position, shown in Fig. 5, of the shuttle L it is slightly beyond (to the right of) the first of the series of warp-wires, and the lower jaw is still raised to engage the clamp $O^3$ with the endless carrier-belt K. The shuttle in reaching that position has encountered the pendent arm $e^4$ and moved the rod $B^2$ toward the right far enough to disengage the clutch $e^7$ from both pinions $e^8$ and $e^9$, or maintain it unshipped from both pinions, whereby the endless belt is stationary and does not move the shuttle, notwithstanding its clamped condition thereon; and with the lower jaw raised, the stop-lever $S'$ is, obviously, depressed at its rear end into the path of the spring-abutment $b^3$ to remove it from the path of the studs $b^2$ on the constantly rotating head M to prevent the wheel $L'$ from being rotated. With the parts of the shuttle brought to rest, the pinion $c^3$ coincides with the blank space $c'$ on the gear $L^2$ and the slot in the needle P is lowermost. By turning the lever $d$ to the left, the clutch $e^7$ is caused to engage the pinion $e^9$, thereby effecting movement of the lower section of the belt K toward the right. This movement of the belt carries the shuttle with it, slidingly, on the shaft B, till the trip-finger 12 encounters a stud 23 on the track U, when the continued movement of the shuttle by the belt forces the pin 13 out against its spring 15 till the pin is withdrawn from affording a bearing for the lift-bar end of the bell-crank lever S, whereupon the lower jaw O necessarily drops and with it the needle over the first warp-wire, and the trip 12 drops below the plane of the stops 23. As the lower jaw of the shuttle drops it pulls on the link 18 to raise the stop-end of the lever $S'$ from the abutment $b^3$, which then is immediately retracted by its controlling spring and brought into the path of the studs $b^2$ on the rotating head M, one of which quickly encounters the abutment and accordingly rotates the wheel $L'$. The gear $L^2$, in a complete rotation of the wheel, rotates the pinion $c^3$, and consequently the shaft $c^4$ and pinion $a^2$ and needle P, three times; and the arrangement is such that a large tooth $c$ of the gear $L^2$ engages the pinion $c^3$ the better to overcome the resistance of the needle in starting.

As in the aforesaid patented construction, while the needle is winding the woof-wire about the first warp-wire the end of the coil $W^3$ should be held by a pair of pliers in the hand of the operator to prevent its withdrawal from the eye of the needle by the strain.

During the three revolutions of the needle about the warp-wire, its longitudinal reciprocation, to produce the desired form of knot referred to, is effected by the action of the cam $L^4$ on the rod T. At the end of one revolution of the wheel $L'$ its cam $L^3$ acts on the adjacent end of the bell-crank S to raise its lift-bar end and with it the lower jaw O to engage the clamp $O^3$ with the traveling belt K; and when the lower jaw has been thus raised, the dog 21 springs against the shoulder 25 (Fig. 32) at the end of the lifting-cam $L^3$, to lock the wheel $L'$ against any backward turning by the strain of sustaining the lower jaw. The rise of the lower jaw, moreover, forces the lower free end of the kicker R' against the coil W³ to hold it while the shuttle is being carried from the warp-wire about which the woof-wire has been knotted to the next adjacent warp-wire, to which it obviously strings the woof-wire. In reaching the position wherein the needle P is above the next warp-wire W, the trip-finger 12 again encounters a stop-stud 23, as the result of which the lower jaw is again dropped and the woof-wire wound about that warp-wire in the manner described of the first; and these operations of winding a woof-wire about a warp-wire, then raising the needle to clear that warp-wire and moving the shuttle and stringing the woof to the next warp are repeated till the last warp-wire has been reached and has had the woof fastened to it. Then, after raising the lower jaw and in the continued rise of the shuttle by the traveling belt, a stop-finger 26 (Fig. 5) which slides with the shuttle-wheel L' on the main-shaft B, encounters the pendent arm on the reciprocable rod B², thereby shifting the latter toward the left (regarded from the front of the machine) and engaging the clutch $e^7$ with the pinion $e^8$ to reverse the motion of the belt K and drive its lower section toward the right. This carries the shuttle back to its initial position somewhat beyond the first of the series of warp-wires where it encounters the arm $e^4$ and stops; and the trip-finger 12 is beveled on its right or "return" side, as shown in Fig. 33, to slip, against the resilience of the spring 14, under each stop-stud 23 as the latter is encountered and passed by it. Thereupon the machine is ready to have the handle $q^4$ again turned toward the left to lower the tension-device C, uncoil the coilers D, actuate the feed and take-up and reverse the coilers to engage and coil the freshly fed lengths of warp-wire, preparatory to repeating the action of the shuttle by manipulating the lever $d$.

Thus the parts of the machine and their functions are described in minute detail in order that the construction and operation of the extremely complicated mechanism may be comprehended. My improvement is not, however, dependent on the employment of the exact details of construction herein shown and described, and I do not wish to be understood as limiting it to the same, as they may be variously changed, even to the omission of parts, as, for example, the coiler-mechanism, without departing from the spirit of my invention, the appended claims for which I intend shall be construed as broadly as the state of the prior art may warrant.

What I claim as new, and desire to secure by Letters Patent, is—

1. In a wire-fence machine, the combination of take-up mechanism, to which the warp-wires are directed from the supply thereof, and a wire-feed formed with relatively compressible and separable clamps between which the warp-wires pass, said feed being reciprocably supported on the frame of the machine, and actuating means for the take-up and feed, substantially as described.

2. In a wire-fence machine, the combination of take-up mechanism, to which the warp-wires are directed from the supply thereof, a wire-feed formed with a stationary set of relatively compressible and separable clamps and a similar set of clamps supported to be reciprocated with relation to the stationary set, and between which clamps of both sets the warp-wires pass, tightening means for each set of said clamps, and actuating mechanism operating to reciprocate the movable set of clamps and actuate the take-up and to operate said tightening means to compress one set of clamps while the other set is released, substantially as described.

3. In a wire-fence machine, the combination of take-up mechanism, to which the warp-wires are directed from the supply thereof, a wire-feed formed of a set of relatively compressible and separable clamps on a stationary bar and a similar set of clamps on a bar supported to be reciprocated with relation to the stationary bar and having extending backward from it a tension and guide device for the warp-wires which pass from it between said clamps, tightening means for each set of said clamps, and actuating mechanism operating to reciprocate the movable bar and actuate the take-up and to operate said tightening means to compress one set of clamps while the other set is released, substantially as described.

4. In a wire-fence machine, the combination of take-up mechanism to which the warp-wires are directed from the supply thereof, a wire-feed formed with a stationary set of relatively compressible and separable clamps and a similar set of clamps supported to be reciprocated with relation to the stationary set, and between which clamps of both sets the warp-wires pass, tightening means for each set of said clamps, and actuating mechanism connected with the take-up and the movable set of clamps to operate both simultaneously and containing cam-operated mechanism for said tightening means to compress one set of clamps while the other set is released, substantially as described.

5. In a wire-fence machine, a warp-wire feed formed with the respectively stationary and reciprocable bars F' and F² each carrying a set of relatively compressible and separable clamps $m$, cam-lever tightening means at one end of each said set, a gear $r$ having a pitman-connection from one side with the bar F² and provided with a cam-guide $r'$ on its opposite side, a reciprocable bar $h$ engaging said cam-guide and provided with means for engaging said cam-lever tighteners, and means for driving said gear intermittingly, substantially as described.

6. In a wire-fence machine, a warp-wire feed comprising the respectively stationary and reciprocable bars F' and F² each carrying a set of relatively compressible and separable clamps $m$ affording the intervening spaces $m'$, cam-lever tightening-means at one end of each said set, a gear $r$ having a pitman-connection from one side with the bar $F^2$ and provided with a cam-guide $r'$ on its opposite side, a reciprocable bar $h$ having a recess $h'$ and abutting heads $h^2$ and $h^3$ for engaging said cam-lever tighteners, and means for driving said gear intermittingly, substantially as described.

7. In a wire-fence machine, a warp-wire feed formed with respectively stationary and reciprocable bars $F'$ and $F^2$ each carrying a set of relatively compressible and separable clamps $m$, cam-lever tightening means at one end of each said set, a gear $r$ having a lost-motion pitman-connection from one side with the bar $F^2$ and provided with a cam-guide $r'$ on its opposite side, a reciprocable bar $h$ engaging said cam-guide and provided with means for engaging said cam-lever tighteners, a spring-dog $l'$ in the path of the bar $F^2$ and provided with a depending shoe $l^3$, and a stud $l^5$ on said pitman-connection to bear on the shoe and depress the dog, substantially as described.

8. In a wire-fence machine, the take-up for the finished fencing comprising a rotatably supported drum provided with a self-adjusting compensating attachment operating to decrease the successive throws of the drum as the accumulation of the fencing thereon proceeds, and means operated independently of the accumulation on the drum to adjust the throw of the drum to regulate the tension of winding the fencing thereon and to govern the size of the bundle, substantially as described.

9. In a wire-fence machine, a take-up for the finished fencing, comprising a rotatably supported drum provided with a self-adjusting compensating attachment operating to decrease the throw of the drum in accordance with the increase in its diameter by the accumulations upon it, in combination with a warp-wire feed with which said compensating attachment is controllably connected, substantially as described.

10. In a wire-fence machine, a take-up for the finished fencing comprising a rotatably supported drum having a crank-arm carrying a self-adjusting sliding head and means operated independently of the accumulation on the drum to adjust the extent of the throw of the drum to regulate the tension of winding the fencing thereon and govern the size of the bundle, substantially as described.

11. In a wire-fence machine, the combination with a warp-wire feed, of a take-up for the finished fencing, comprising a rotatably supported drum having a crank-arm carrying a sliding head connected with said feed and provided with a nut, a screw engaging said nut, and gears operated by the throwing of the drum to turn the screw in the nut to advance said head toward the outer end of the crank-arm, substantially as described.

12. In a wire-fence machine, the combination with a warp-wire feed, of a take-up for the finished fencing, comprising a rotatably supported drum having a crank-arm carrying a sliding head connected with said feed and provided with a nut, a screw engaging said nut and carrying a beveled gear at its outer end, a beveled gear meshing with said screw-gear and provided with a ratchet, a dog engaging the ratchet and supported on a rocking head, and a rod pivotally connecting said head eccentrically with a stationary part of the machine, substantially as and for the purpose set forth.

13. In a wire-fence machine, the combination with a warp-wire feed, of a take-up for the finished fencing, comprising a rotatably supported drum having one of its journals formed into a crank-arm, a sliding head on said crank-arm connected with the feed and having an extension carrying a divided nut having a pin extending from each section through an opening in said extension, a head rotatably fastened on said extension and having opposite cam-grooves engaging said pins to cause the nut-sections to approach and recede from each other by turning the rotary head in opposite directions, a screw engaging said nut, and gears operated by each throw of the drum to turn the screw in the nut to advance said head toward the outer end of the crank-arm, substantially as described.

14. In a wire-fence machine, the combination with a warp-wire feed, of a take-up for the finished fencing, comprising a rotatably supported drum $E$ having one of its heads provided with a ratchet $s'$ and the journal at said head formed into a crank-arm, a sliding head $g$ on said crank-arm and connected with the feed and provided with means for advancing it toward the outer end of the crank-arm with the throwing of the drum, and a dog-carrying head on said journal engaging said ratchet $s'$, substantially as described.

15. In a wire-fence machine, the combination with the feed and take-up, of an interposed tension-device $C$ journaled on opposite sides of the machine near its forward end, bell-cranks $v$ on rock-shafts at opposite ends of the tension-device each connected therewith from one arm and having their other arms connected together, and a crank-arm $v^3$ on the rock-shaft of one of said bell-cranks by which to lower and raise the tension-device on its journals, substantially as described.

16. In a wire-fence machine, the combination with the feed and take-up, of an interposed rocking tension-device $C$, and a handle with which the tension-device is operatively connected, substantially as and for the purpose set forth.

17. In a wire-fence machine, the combination with the feed, take-up and coilers, of a rocking tension device $C$, and a longitudinally reciprocable rod $q$ with which the tension-device is operatively connected and carrying the rack $p^3$ for engaging the coiler-pinions to actuate them, substantially as described.

18. In a wire-fence machine, the combination with the feed and take-up and their operating gear-wheel $r$ provided with a trip $z$, of a pinion $o$ loose on the main-shaft B, meshing with said gear-wheel and carrying a spring-abutment $o^3$, a drive-pulley $w^2$ loose on said shaft and carrying a stud $w^5$, a rock-shaft $n$ provided with a stop-finger $n'$ to engage said abutment, a trip-finger $n^6$ with which said rock-shaft is controllably connected, a pinion-section $r^2$ on the gear $r$, a rotary shaft $r^4$ carrying a pinion $r^3$ to mesh with said pinion-section, and an abutment-device terminating in a crank $r^{10}$ into the path of which said finger $n^6$ extends, a rocking tension-device C, and a longitudinally reciprocable rod $q$ with which said tension-device is operatively connected and connected with said crank $r^{10}$, substantially as and for the purpose set forth.

19. In a wire-fence machine, the combination with the feed and take-up and their operating gear-wheel $r$ provided with a trip $z$, of a pinion $o$ loose on the main-shaft B, meshing with said gear-wheel and carrying a spring-abutment $o^3$, a drive-pulley $w^2$ loose on said shaft and carrying a stud $w^5$, a rock-shaft $n$ provided with a stop-finger $n'$ to engage said abutment, a trip-finger $n^6$ with which said rock-shaft is controllably connected, a pinion-section $r^2$ on the gear $r$, a rotary shaft $r^4$ carrying a pinion $r^3$ to mesh with said pinion-section, and a lost-motion abutment-device terminating in a crank $r^{10}$ into the path of which said finger $n^6$ extends, a set of rotary coilers D, a reciprocable rack $p^3$ engaging the coiler-pinions, and a reciprocable operating bar $q$ connected with the rack and with said crank, substantially as and for the purpose set forth.

20. In a wire-fence machine, the combination with the feed and take-up and their operating gear-wheel $r$ provided with a trip $z$, of a pinion $o$ loose on the main-shaft B, meshing with said gear-wheel and carrying a spring-abutment $o^3$, a drive-pulley $w^2$ loose on said shaft and carrying a stud $w^5$, a rock-shaft $n$ provided with a stop-finger $n'$ to engage said abutment, a trip-finger $n^6$ with which said rock-shaft is controllably connected, a pinion-section $r^2$ on the gear $r$, a rotary shaft $r^4$ carrying a pinion $r^3$ to mesh with said pinion-section, and a lost-motion abutment-device terminating in a crank $r^{10}$ into the path of which said finger $n^6$ extends, a rocking tension-device C operatively connected with said crank, a set of coilers D, a reciprocable rack $p^3$ engaging the coiler-pinions, and a reciprocable operating bar $q$ connected with the rack and with said crank, substantially as and for the purpose set forth.

21. In a device for use in the manufacture of wire fence comprising wires crossing each other and secured together where they cross, for winding and stringing a woof-wire upon the warp-wires, a beveled cog-wheel loosely supported on a rotary shaft, automatically co-operating engaging means on the shaft and wheel and a jaw-lifting cam on said wheel, a stationary jaw and a pivotal jaw co-operating therewith and carrying the slotted rotary needle geared to said wheel and adapted to hold the woof-wire, a stop-lever fulcrumed on the pivotal jaw to release the engaging means on the wheel from that on the shaft, a lifting-lever fulcrumed on the stationary jaw to extend at one end into the path of the lifting cam and at its opposite end to engage the pivotal jaw to lift it, trip-mechanism for releasing the pivotal jaw from the lifting lever, and a clamp on the jaws, substantially as and for the purpose set forth.

22. In a device for use in the manufacture of wire fence comprising wires crossing each other and secured together where they cross, for winding and stringing a woof-wire upon the warp-wires, a beveled cog-wheel loosely supported on a rotary shaft, automatically co-operating engaging means on the shaft and wheel and a jaw-lifting cam on said wheel, a stationary jaw and a pivotal jaw co-operating therewith and carrying a slotted rotary needle geared to said wheel and adapted to hold the woof-wire, a stop-lever fulcrumed on the pivotal jaw to release the engaging means on the wheel from that on the shaft, a lifting-lever fulcrumed on the stationary jaw to extend at one end into the path of said lifting-cam and at its opposite end to engage the pivotal jaw to lift it, trip-mechanism for releasing the pivotal jaw from the lifting lever, a clamp between the jaws, and a kicker for the woof-wire coil fulcrumed on the stationary jaw and linked to the pivotal jaw, substantially as and for the purpose set forth.

23. In a device for use in the manufacture of wire fence comprising wires crossing each other and secured together where they cross, for winding and stringing a woof-wire upon the warp-wires, the combination with the beveled cog-wheel, the co-operating stationary and pivotal jaws and the rotary slotted woof-wire carrying needle geared to the wheel, of a jaw-lifting cam $L^3$ on said cog-wheel, a bell-crank lever fulcrumed on the stationary jaw to engage at one end said cam and at its opposite end the pivotal jaw, trip-mechanism for releasing the pivotal jaw from the lifting-lever, and a clamp on the jaws, substantially as and for the purpose set forth.

24. In a wire-fence machine, the combination with an automatic feed and an automatic take-up, of a shuttle comprising a beveled cog-wheel loose on a continuously rotating shaft and carrying a jaw-lifting cam $L^3$, automatically co-operating engaging means on the shaft and wheel, a stationary jaw and a pivotal jaw co-operating therewith and carrying the slotted rotary needle geared to said wheel and adapted to hold the woof-wire, a stop-lever fulcrumed on the pivotal jaw to release the engaging means on the wheel from that on the shaft, a lifting-lever S' fulcrumed on the stationary jaw to extend at one end into the path of said lifting-cam, a trip-finger 12 on a spring-controlled longitudinally movable pin 13 supported on the pivotal jaw and extending normally into the path on the opposite arm of the lifting-lever, an endless traveling belt K, a clamp O³, formed between the jaws, to engage said belt, a bar U affording a track for the shuttle and provided with studs 23 projecting at intervals into the path of said trip-finger, and means for reversing the direction of travel of said belt, substantially as and for the purpose set forth.

CHARLES M. LAMB.

In presence of—
  M. J. FROST,
  W. U. WILLIAMS.